(12) United States Patent
Mullins

(10) Patent No.: US 9,734,000 B2
(45) Date of Patent: Aug. 15, 2017

(54) SEAMLESS TRANSITIONS BETWEEN APPLICATIONS AND DEVICES

(71) Applicant: Microsoft Technology Licensing, LLC, Redmond, WA (US)

(72) Inventor: Chris L. Mullins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/743,659

(22) Filed: Jun. 18, 2015

(65) Prior Publication Data

US 2016/0371130 A1    Dec. 22, 2016

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/54* | (2006.01) |
| *G06F 9/48* | (2006.01) |

(52) U.S. Cl.
CPC .............. *G06F 9/547* (2013.01); *G06F 9/485* (2013.01); *G06F 9/543* (2013.01); *G06F 9/546* (2013.01)

(58) Field of Classification Search
CPC ...................................................... G06F 9/547
USPC ......................................................... 719/328
See application file for complete search history.

(56) References Cited

U.S. PATENT DOCUMENTS

| | | |
|---|---|---|
| 6,401,138 B1 | 6/2002 | Judge et al. |
| 7,325,032 B2 | 1/2008 | Zuberec et al. |

(Continued)

FOREIGN PATENT DOCUMENTS

| | | |
|---|---|---|
| WO | 2014120222 A1 | 8/2014 |
| WO | 2014130447 A1 | 8/2014 |

OTHER PUBLICATIONS

Mitra, Abhik, "Passing Context from Android Native App to Web View Activity, While Building a Hybrid App" published on Nov. 14, 2012 by Wordpress [online][retrieved on Jun. 18, 2015] retrieved from: https://iamabhik.wordpress.com/2012/11/14/passing-context-from-android-native-app-to-web-view-activity-while-building-a-hybrid-app/ 5 pages.

(Continued)

*Primary Examiner* — Timothy A Mudrick
(74) *Attorney, Agent, or Firm* — Lee & Hayes, PLLC

(57) ABSTRACT

Technologies are described herein for seamless transitions between applications and devices. A network-based or local context service provides functionality for storing and retrieving context data. The context service can expose a create activity method for creating a unique activity identifier ("ID"). The activity ID is associated with an activity, such as the execution of an application on a computing device. The interface exposed by the context service can also expose a method for storing context data, such as data that can be used to return an application to its pre-transition state. The interface exposed by the context service can also expose a method for obtaining context data. The context service can also expose a method for completing an activity. The context data can also be exposed to other services, such as business intelligence network services that analyze the context data to provide recommendations or other types of information to users.

20 Claims, 10 Drawing Sheets

(56) References Cited

U.S. PATENT DOCUMENTS

| | | | |
|---|---|---|---|
| 7,475,277 B1* | 1/2009 | Holdman | G06F 11/1435 |
| | | | 714/5.11 |
| 7,647,328 B2 | 1/2010 | Fusari et al. | |
| 7,734,687 B2 | 6/2010 | Sargent | |
| 7,849,498 B2 | 12/2010 | Royer et al. | |
| 8,024,732 B2 | 9/2011 | Sheehan et al. | |
| 8,224,894 B1 | 7/2012 | Parks et al. | |
| 8,839,266 B1 | 9/2014 | Partridge et al. | |
| 2002/0087657 A1 | 7/2002 | Hunt | |
| 2003/0018692 A1* | 1/2003 | Ebling | G06F 9/542 |
| | | | 718/108 |
| 2005/0268301 A1* | 12/2005 | Kelley | G06F 9/4843 |
| | | | 718/100 |
| 2006/0069713 A1 | 3/2006 | Wei et al. | |
| 2006/0239295 A1* | 10/2006 | Rao | G06F 9/465 |
| | | | 370/466 |
| 2007/0050722 A1 | 3/2007 | Schulz et al. | |
| 2009/0003387 A1 | 1/2009 | Bernardi et al. | |
| 2009/0019424 A1 | 1/2009 | Klein et al. | |
| 2009/0198820 A1 | 8/2009 | Golla et al. | |
| 2012/0095956 A1* | 4/2012 | Xiong | G06Q 10/067 |
| | | | 707/600 |
| 2013/0006874 A1 | 1/2013 | Klemm | |
| 2013/0024873 A1 | 1/2013 | Hillier | |
| 2013/0058215 A1 | 3/2013 | Koponen et al. | |
| 2013/0212212 A1 | 8/2013 | Addepalli et al. | |
| 2013/0219413 A1 | 8/2013 | Hartz et al. | |
| 2013/0339980 A1 | 12/2013 | Meshar et al. | |
| 2014/0033235 A1 | 1/2014 | Foster et al. | |
| 2014/0095428 A1* | 4/2014 | Beresniewicz | G06F 17/30306 |
| | | | 707/609 |
| 2014/0188815 A1 | 7/2014 | Mentz et al. | |

OTHER PUBLICATIONS

U.S. Patent Application titled: "Cross Device Task Continuity" U.S. Appl. No. 14/472,914, filed Aug. 29, 2014, first named inventor: Jain.

PCT International Search Report and Written Opinion for Application No. PCT/US2016/037306, mailed on Sep. 5, 2016 (13 pages).

Written Opinion of the International Preliminary Examining Authority for International Application No. PCT/US2016/037306, dated May 12, 2017, 5 pages.

\* cited by examiner

SEAMLESS TRANSITIONS BETWEEN APPLICATIONS AND DEVICES

BACKGROUND

Users of mobile devices, such as smartphones and tablet computing devices, frequently switch between different full-screen applications to perform different tasks. For example, and without limitation, a mobile device user might utilize a full-screen communications application to engage in a text or video conversation messaging with another user, or users. The same user might then transition to a second full-screen application in order to obtain information, such information about a restaurant or another type of activity, relevant to the conversation.

Following the use of the second application, the user might return to the messaging application in order to share information about the restaurant or other type of activity with the other user, or users. When the user returns to the messaging application, however, it is possible that the user will not be returned to the location in the messaging application at which they were located before they transitioned to the second application. This can be disorienting and sometimes confusing for users.

In order to share data obtained through the use of the second application with other user, or users, the first user would also typically need to utilize a copy/paste mechanism. On certain mobile devices, the required gestures or keystrokes required to use such a copy/paste mechanism might not be completely intuitive for the user. As a result, the user might not understand how to use the copy/paste mechanism to share the information with the other user, or users, which might also result in frustration.

It is with respect to these and other considerations that the disclosure made herein is presented.

SUMMARY

Technologies are described herein for providing seamless transitions between applications and devices. Through an implementation of the technologies disclosed herein, context data describing the current state of an application can be stored and shared between applications executing on the same or different computing devices. For instance, in the example given above, a first application (i.e. the messaging application) can store context data describing aspects of its current state. The first application can also store other types of context data for use by other applications.

When a transition is made from the first application to a second application, the second application can obtain the context data that was previously stored by the first application. The second application can then perform operations utilizing the context data and, potentially, update the context data with a transcript describing the performed operations. When control is subsequently returned to the first application, the context data can be utilized to return the first application to the state it was in at the time of the transition to the second application. For example, and without limitation, a user interface ("UI") provided by the first application might be returned to the state it was in just prior to the transition to the second application. The transcript posted by the second application can also be displayed or utilized in other ways by the first application.

In order to provide the functionality described above, a context service is provided in some configurations. The context service can be implemented as a network-based context service to enable seamless transitions between applications executing on the same or different network connected computing devices. The context service can also be implemented as a local context service to enable seamless transitions between applications executing on the same computing device, which might not be connected to a network.

The context service is configured in some implementations to expose an external interface for accessing its functionality. For example, and without limitation, when the context service is implemented as a network-based context service, the context service can be configured to expose a Web services application programming interface ("API") for accessing its functionality. When the context service is implemented as a local service, the context service can be configured to expose a local API for use by applications executing on the same device. Other types of interfaces can be exposed in other configurations.

The interface exposed by the context service can include various methods. For example, and without limitation, the interface can expose a create activity method for creating a unique activity identifier ("ID"). The activity ID is associated with an activity, such as the execution of an application on a mobile device. If a transition is made to another application, a unique activity ID might also be created for that application along with a correlation record that can be tracked to enable an activity graph. The activity graph can be generated and maintained that defines the relationships between activities and activity IDs. For example, when a transition is made from a first application to a second application, the first application might be considered the parent activity of the second application. The activity graph can define a stack that describes relationship between the first application and the second application.

The interface exposed by the context service can also expose a method for storing context data. An application might call this method, for instance, in order to store context data that describes aspects of their current state. For example, and without limitation, an application might store a deep hyperlink that can be utilized to return the UI provided by the application to the state it was in at the time control was transitioned away from the application. This method can also be utilized to store other types of context data describing an activity for consumption and utilization in other ways by other applications.

The interface exposed by the context service can also expose a method for obtaining previously stored context data. For example, when a transition is made from a first application to a second application, the second application may call such a method in order to obtain the context data posted by the first application. The second application can then utilize the context data in various ways. The second application can also utilize the method for storing context data in order to store a transcript of its operations. When control is returned to the first application, the first application can retrieve and utilize the context data in order return the first application to its pre-transition state and/or for other purposes.

In some configurations, the context service can also expose a method for completing an activity. A call to such a method will delete any stored context data that is associated with a specified activity ID and remove the activity ID from the activity graph described above. The context service can also be configured to expose the context data to other services, such as business intelligence network services that analyze the context data to provide recommendations or other types of information to users. The context data might also be utilized in other ways in other configurations.

It should be appreciated that the various methods described above are merely illustrative and that the context service might expose other or additional methods in other configurations. It should also be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
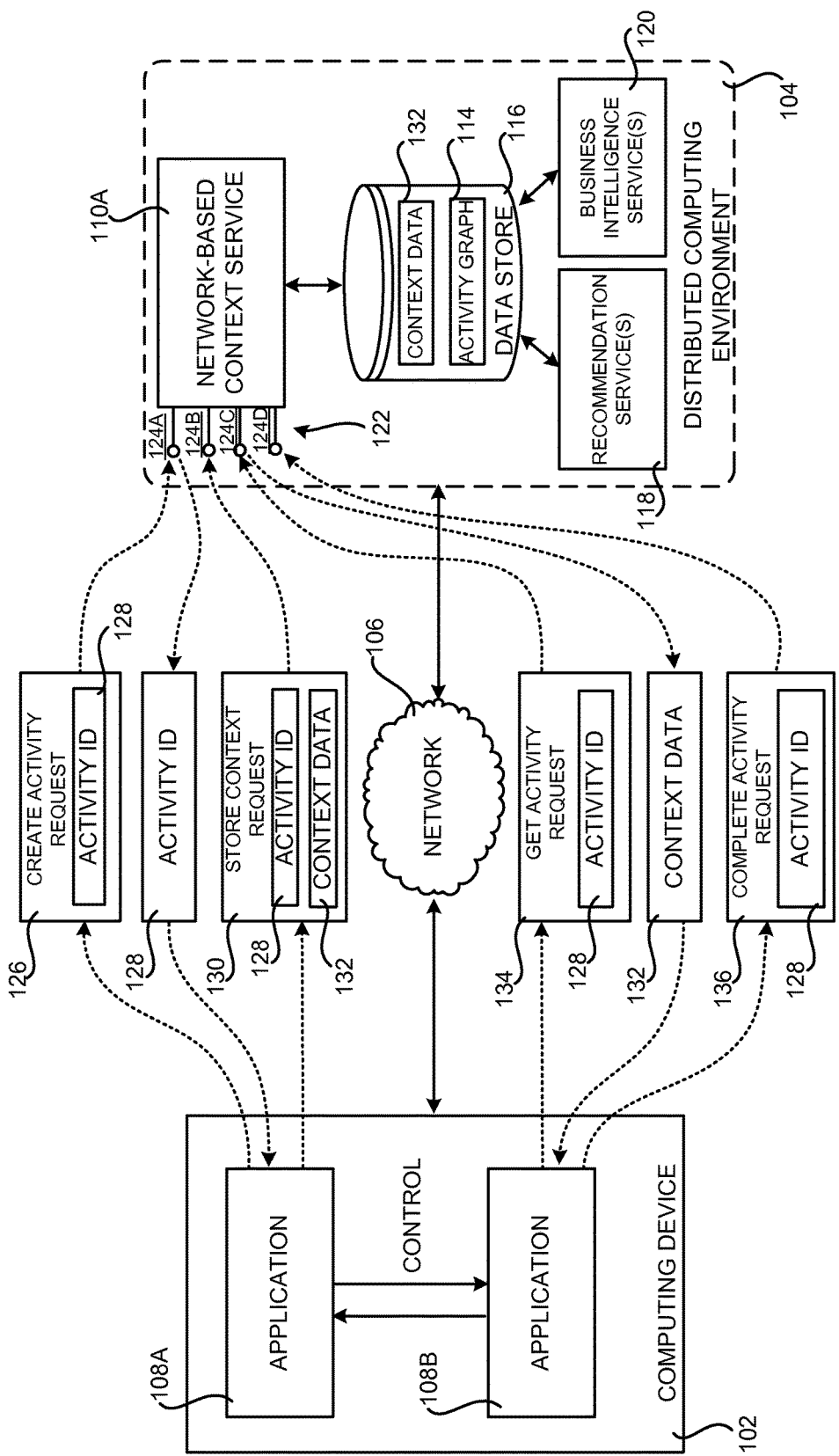
FIG. 1A is a computer system architecture diagram showing aspects of the operation of a network-based context service utilized in implementations disclosed herein.

The following detailed description is directed to technologies for seamless transitions between applications and devices. Through an implementation of the technologies disclosed herein, an application can be returned to the state that it was in just prior to a transition to another application. The use of this mechanism can eliminate the confusion sometimes caused when an application is returned to a different state when control is returned following a transition to another application. Additionally, applications can share and utilize context data that can be presented to users and/or in other ways. Use of the context data in this way can free users from having to utilize the sometimes complex copy/paste mechanisms described above and to enable applications to interoperate in a manner beyond what typical copy/paste mechanisms permit. Implementations of the technologies disclosed herein can also provide other technical benefits in addition to those described above such as, but not limited to, improved battery life, reduced memory usage, and others.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing seamless transitions between applications and devices will be described. In particular, FIG. 1A is a computer system architecture diagram showing aspects of the operation of a network-based context service 110A utilized in implementations disclosed herein to provide seamless transitions between applications and devices.

As shown in FIG. 1A, the network-based context service 110A is executed in a distributed computing environment 104 in one particular implementation. The distributed computing environment 104 includes a computing environment operating on, in communication with, or as part of a network. One or more computing devices. such as the computing device 102, can communicate with the distributed computing environment 108 via a network 106, such as the Internet.

The computing device 102 can be a laptop computer, a desktop computer, a "slate" or tablet computing device, a smartphone, or other mobile computing device, or virtually any other type of computing device. It should be understood that although a single computing device 102 is illustrated in FIG. 1A, a greater number of computing devices 102 can communicate with the computing environment 104 in order to utilize the functionality provided by the network-based context service 110A. Additional details regarding the configuration and utilization of the distributed computing environment 104 will be provided below with reference to FIG. 8.

As also shown in FIG. 1A, the computing device 102 is configured to execute applications 108A and 108B (which might be referred to herein individually as "an application 108" or collectively as "the applications 108"). In some configurations, the computing device 102 presents an application 108 executing in the foreground as a full-screen application. For example, when the application 108A is executing in the foreground, the UI presented by the application 108A will consume the entirety of the display (not shown in FIG. 1A) of the computing device 102. When control is transitioned to the application 108B such that the application 108B is executing in the foreground, the UI presented by the application 108B will consume the entirety of the display of the computing device 102.

In this regard, it should be appreciated that while the configurations presented herein are primarily described in the context of applications 108 that operate using the entirety of a display screen, the technologies disclosed herein are not limited to such an environment. Rather, the configurations presented herein can be utilized in other execution environments, where applications 108 utilize UI windows, a split screen, or other UI mechanisms to share the available area of the screen display. It should also be appreciated that although a single computing device 102 is illustrated in FIG. 1A, the configuration shown in FIG. 1A can also be utilized in a similar fashion to share context data 132 between applications 108 executing on different network-connected computing devices 102.

As discussed briefly above, through an implementation of the technologies disclosed herein, context data 132 describing the current state of an application, such as the application 108A, can be stored and shared between applications 108 executing on the same or different computing devices 102. For instance, in the example shown in FIG. 1A, a first application 108A can utilize the network-based context service 110A to store context data 132 describing aspects of its current state. The first application 108A can also store other types of context data 132 for use by other applications, such as the application 108B.

When a transition is made from the first application 108A to a second application 108B (e.g. the second application 108B begins executing in the foreground), the second application 108B can obtain the context data 132 from the network-based context service 110A that was previously stored by the first application 108A. The second application 108B can then perform operations utilizing the context data 132 and, potentially, utilize the network-based context service 110A to update the context data 132 with additional data (which might be referred to herein as a "transcript") that describes the operations that it performed.

When control is subsequently returned to the first application 108A from the second application 108B, the context data 132 can be obtained from the network-based context service 110A and utilized to return the first application 108A to the state it was in at the time of the transition to the second application 108B. For example, and without limitation, a UI provided by the first application 108A might be returned to the state it was in just prior to the transition to the second application 108B. The transcript posted by the second application 108B can also be displayed or utilized in other ways by the first application 108A.

In order to provide the functionality described above to network-connected computing devices 102, the context service 110 can be implemented as a network-based context service 110A to enable seamless transitions between applications 108 executing on the same or different network-connected computing devices 108. The functionality provided by the context service 110 can also be implemented as a local context service 110B (shown in FIG. 1B and described below) that executes locally on the computing device 102 to enable seamless transitions between applications 108 executing on the same computing device 102, which might not be connected to a network 106. Additional details regarding the configuration and operation of a local context service 110B will be provided below with regard to FIG. 1B. The network-based context service 110A and the local context service described below might be referred to herein individually or collectively as "a context service 110."

The context service 110 presented herein is configured in some implementations to expose an external interface 122 for accessing its functionality. For example, and without limitation, when the context service 110 is implemented as a network-based context service 110A, the context service 110 can be configured to expose a Web services API for accessing its functionality. When the context service 110 is implemented as a locally executing service (i.e. executing on the same computing device 102 as the applications 108 that utilize its methods) as described below, the context service 110 can be configured to expose a local API for use by applications 108 executing on the same computing device 102. Other types of interfaces can be exposed in other configurations.

The interface 122 exposed by the context service 110 can include various methods 124. For example, and without limitation, the interface 122 can expose a create activity method 124A for creating a unique activity ID 128. A call to the create activity method 124A (e.g. the create activity request 126 shown in FIG. 1A) creates a new unique activity ID 128 and associates the activity ID 128 with an activity, such as the execution of an application 108A on the computing device 102. The new activity ID 128 can be returned to the calling application 108 in response to the call to the create activity ID method 124A.

In some configurations, an activity ID 128 can be supplied with a call to the create activity method 124A. If an activity 128 is supplied with a call to the create activity method 124A, then a "transfer" record might be created in the activity graph 114 described below. The transfer record indicates that control has been transferred from one application 108 to another application. For example, and without limitation, one application 108A might call the create activity method 124A with its own activity ID 128 when control is about to be handed to another application 108B. In response thereto, the network-based context service 110A might create a new activity ID 128 for the child activity (i.e. the application 108B) and return the new activity ID 128 in response to the call. The network-based context service 110A might also associate the parent activity (i.e. the execution of the application 108A) with the child activity (i.e. the execution of the application 108B) in the activity graph 114 described below. In this way, if a transition is made to another application, such as the application 108B, a unique activity ID 128 can be associated with the application 108B and the parent/child relationship between the applications can be reflected in an activity graph 114, described below. Additional details regarding the operation of the create activity method 124A will be provided below with regard to FIG. 2.

As described briefly above, the context service 110 can also create and maintain an activity graph 114 that defines the parent/child relationships between activities and activity IDs 128. For example, and as described above, when a transition is made from a first application 108A to a second application 108B, the first application 108A might be considered the parent activity of the second application 108B. In this way, the activity graph 114 can maintain data that defines the parent/child relationship between the first application 108A and the second application 108B. In one particular implementation, the activity graph 114 is implemented as a directed cyclic graph. Other implementations can also be utilized.

The interface 122 exposed by the context service 110 can also expose a store context method 124B for storing context data 132. An application, such as the application 108A, can generate a call (illustrated in FIG. 1A as the store context request 130) to this method 124B, for instance, in order to store context data 132 that describes aspects of its current state. For example, and without limitation, the application 108A might store a deep hyperlink or another type of data that can be utilized to return the UI provided by the application 108A to the state it was in at the time control was transitioned away from the application 108A to another application, such as the application 108B.

The store context method 124B can also be utilized to store other types of context data 132 for consumption and utilization in other ways by other applications 108. For example, and without limitation, the store context method 124B can be utilized to store context data 132 that includes arbitrary XML or JSON for consumption and/or modification by another application 108. Data in other data formats can also be stored in a similar fashion. Additional details regarding the operation of the store context method 124B will be provided below with regard to FIG. 3.

The interface 122 exposed by the context service 110 can also expose a get activity method 124C for obtaining previously stored context data 132. For example, when a transition is made from a first application 108A to a second application 108B, the second application 108B may generate a call (illustrated in FIG. 1A as the get activity request 134) to the get activity method 124C in order to obtain the context data 132 previously stored by the first application 108A. The call to the get activity method 124C specifies the activity ID 128 of the activity for which context data 132 is to be returned.

In response to a call to the method 124C, the context service 110 returns the previously stored context data 132 that is associated with the specified activity ID 128. The second application 108B can then utilize the context data 132 in various ways. The second application 108B can also utilize the store context method 124B, described above, in order to store a transcript of its operations and/or other types of data.

When control is returned to the first application 108A, the first application 108A can also utilize the get activity method 124C to retrieve and utilize the previously stored context data 132. The context data 132 can then be utilized in order return the first application 108A to its pre-transition state and/or for other purposes. For example, and without limitation, a deep hyperlink previously stored by the application 108A can be utilized to return the application 108A to its pre-transition state following a return of control from the application 108B. Additional details regarding the operation of the get activity method 124C will be provided below with regard to FIG. 4.

In some configurations, the context service can also expose a complete activity method 124D for completing an activity. A call (illustrated in FIG. 1A as the complete activity request 136) to such a method will cause the context service 110 to delete any stored context data 132 that is associated with the specified activity ID 128 and remove the activity ID 128 from the activity graph 114 described above. Additional details regarding the operation of the complete activity method 124D will be provided below with regard to FIG. 5.

In some configurations, the context service 110 is also configured to expose the context data 132 to other services, such as business intelligence services 120 like a recommendation service 118 that analyzes the context data 132 to provide recommendations or other types of information to users of computing devices 102 that utilize the context service 110. The context service 110 might expose the context data 132 to other services in other configurations.

It should be appreciated that the various methods 124 described above are merely illustrative and that the context service 110 might expose other or additional methods 124 in other configurations. Additional aspects of the configuration, operation, and utilization of the methods 124 will be provided below with regard to FIGS. 2-5. A timing diagram illustrating aspects of the utilization of a context service 110 to provide a seamless transition between applications 108A and 108B in one particular usage scenario will be described below with regard to FIG. 6.

Figure 1B:
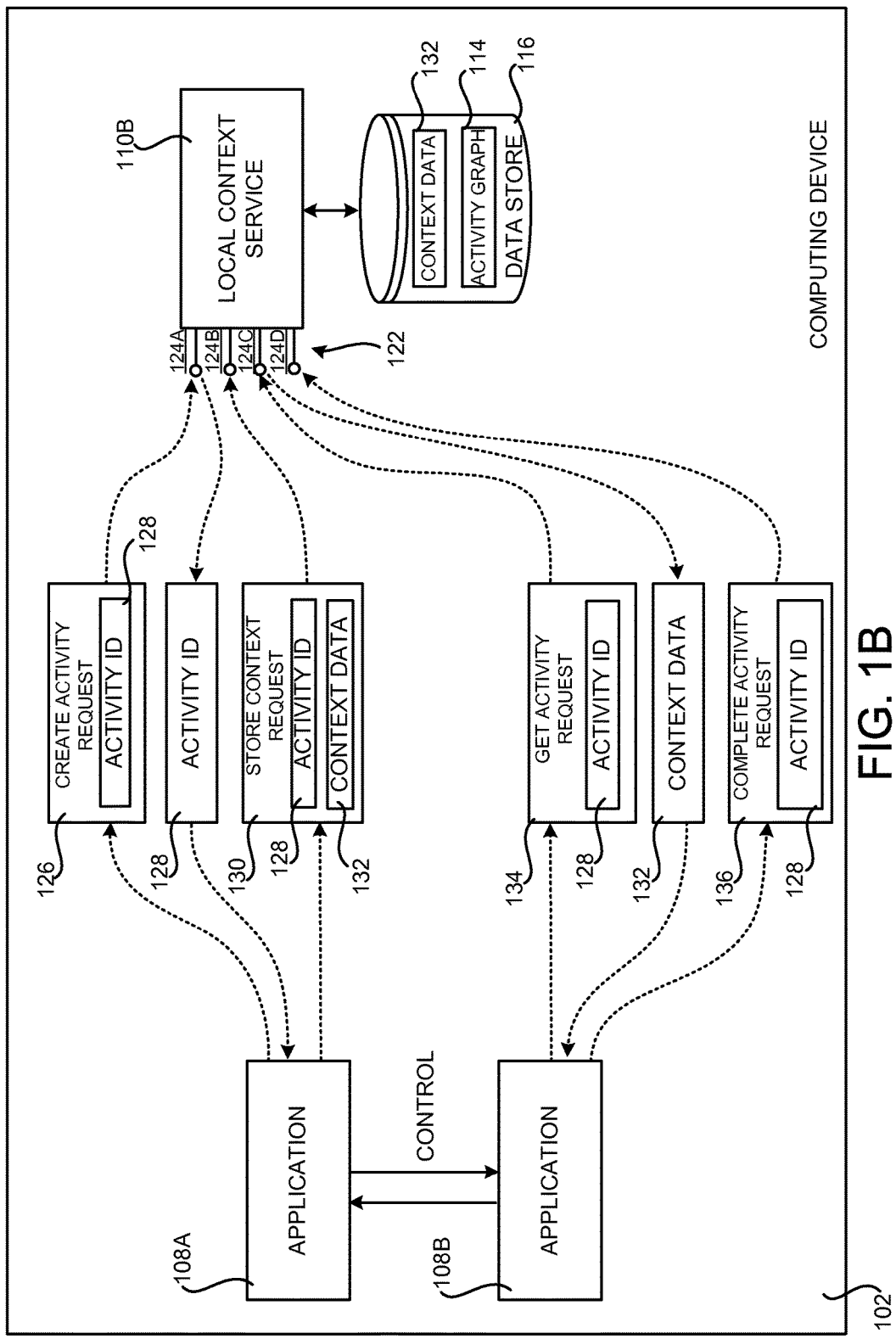
FIG. 1B is a computer system architecture diagram showing aspects of the operation of a local context service utilized in implementations disclosed herein.

FIG. 1B is a computer system architecture diagram showing aspects of the operation of a context service 110 that executes locally on a computing device 102. As shown in FIG. 1B and described briefly above, aspects of the functionality described herein can be provided a local context service 110B in one particular configuration. As discussed briefly above, the local context service 110B executes on the same computing device 102 as the applications 108 that utilize the functionality that it provides. No network connection is required for the applications 108 to call the methods 124 exposed by the local context service 110B through the interface 122. In this regard, it should be appreciated that the interface 122 can be implemented as a locally accessible API in the configuration shown in FIG. 1B. Mechanisms other than a local API might also be utilized in order to enable the applications 108 to call the methods 124 exposed by a locally executing context service 110B.

Other than local execution of the context service 110B, the configuration shown in FIG. 1B operates in the same manner as the configuration illustrated in FIG. 1A and described above. For example, and without limitation, an application 108A executing on the computing device 102 can utilize the method 124A exposed by the local context service 110B to obtain an activity ID 128, utilize the method 124B to store context data 132, and utilize the method 124C to obtain the context data 132. Similarly, the application 108B can utilize the method 124B to obtain the context data 132 previously stored by the application 108A, even when a network connection is not available to the computing device 102. The other methods 124 exposed by the local context service 110B can also be utilized in a similar fashion. Additional details regarding the operation of the methods 124 are provided below with regard to FIGS. 2-5.

It should be appreciated that while the configurations illustrated in FIGS. 1A and 1B show only a single application 108B obtaining context data 132 from the application 108A through the context service 110A and 110B, other configurations might be utilized wherein the context data 132 is shared from one application 108, such as the application 108A, to multiple other applications 108. For example, using the same mechanism described above with regard to FIGS. 1A and 1B, the application 108A can share the context data 132 with multiple other applications 108. Similarly, the application 108B or multiple other applications, can also share the context data 132 with yet other applications 108. In this regard, it should be appreciated that while only two applications 108 have been shown in FIGS. 1A and 1B for ease of illustration and description, the configurations described herein can be utilized with many such applications 108. Other configurations will, therefore, be apparent to those skilled in the relevant art.

Figure 2:
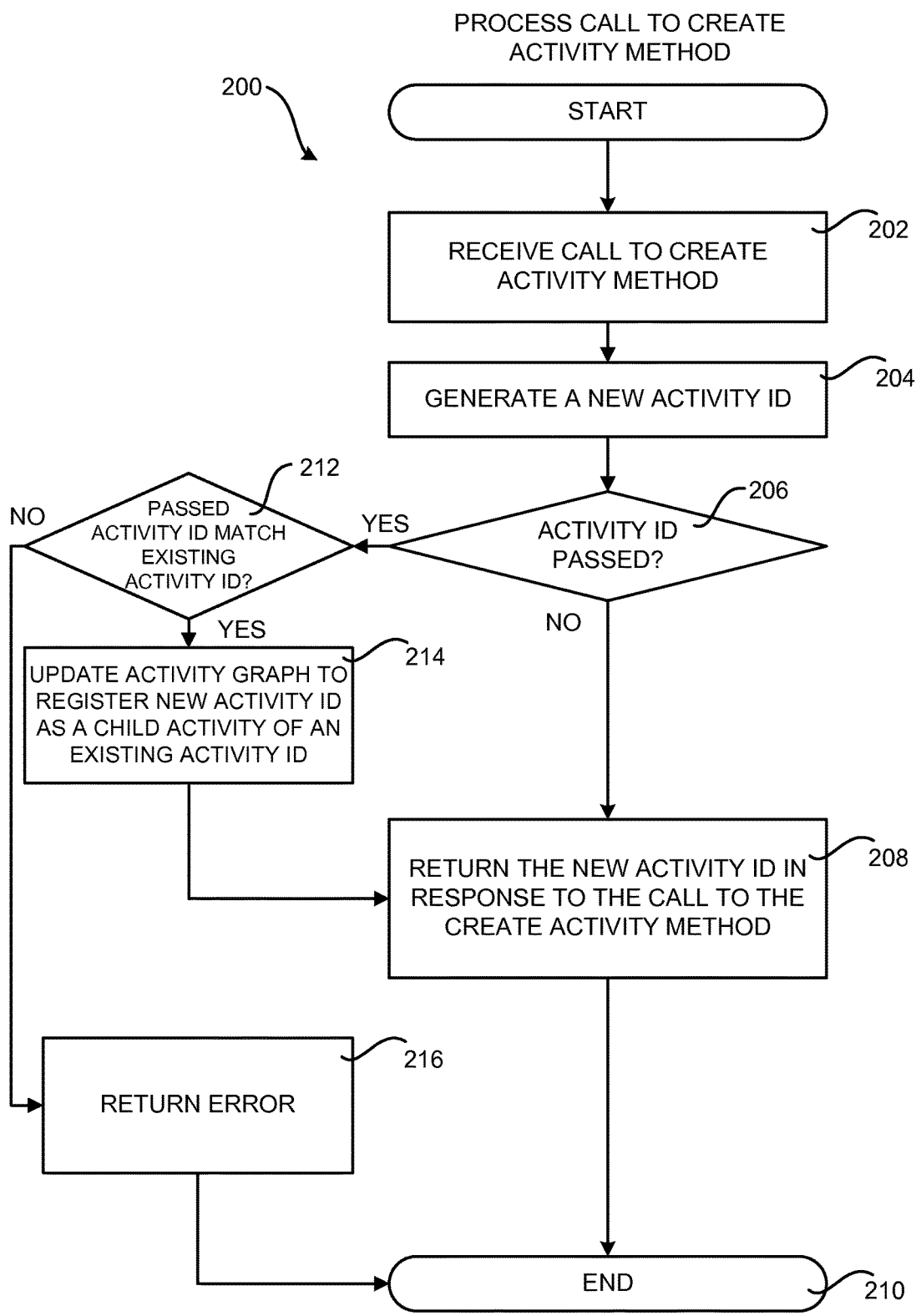
FIG. 2 is a flow diagram showing aspects of the operation of a create activity method exposed by a context service in one implementation disclosed herein.

FIG. 2 is a flow diagram showing a routine 200 that illustrates aspects of the operation of the create activity method 124A exposed by the context service 110 in one implementation disclosed herein. It should be appreciated that the logical operations described herein with regard to FIG. 2 and the other FIGS. can be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 200 begins at operation 202, where the context service 110 (i.e. either the network-based context service 110A or the local context service 110B) receives a call to the create activity method 124A for creating a unique activity ID 128. In response to such a call, the routine 200 proceeds from operation 202 to operation 204, where the context service 110 creates a new unique activity ID 128. The unique ID 128 might be a globally unique identifier ("GUID") or other type of data that uniquely identifies an activity.

From operation 204, the routine 200 proceeds to operation 206, where the context service 110 determines whether the call to the create activity method 124A includes an activity ID 128. If the call does not include an activity ID 128, the routine 200 proceeds from operation 206 to operation 208, where the context service 110 returns the new activity ID 128 created at operation 204 in response to the call to the create activity method 124A. The routine 200 then proceeds from operation 208 to operation 210, where it ends.

If, at operation 206, the context service 110 determines that the call to the create activity method 124A includes an activity ID 128, then the routine 200 proceeds from operation 206 to operation 212. As discussed above, if an activity ID 128 is supplied with a call to the create activity method 124A, then a "transfer" record can be created in the activity graph 114. The transfer record indicates that control has been transferred from one application 108 to another application. Consequently, the context service 110 determines at operation 212 whether the passed activity ID 128 matches an existing activity ID 128 in the activity graph 114. If the passed activity ID 128 does not match an existing ID 128, the routine 200 proceeds from operation 212 to operation 216, where the context service 110 may return an error in response to the call to the create activity method 124A.

If, however, the context service 110 determines at operation 212 that the passed activity ID 128 matches an existing activity ID 128, then the routine 200 proceeds from operation 212 to operation 214. At operation 214, the context service 110 updates the activity graph 132 to reflect that the new activity ID 128 generated at operation 204 is a child of the existing activity ID 128 supplied with the call to the create activity method 124A. The new activity ID 128 that was created at operation 204 is then returned in response to the call to the create activity method 124A at operation 208. In this way, if a transition is made from one application to another application, the parent/child relationship between the applications can be reflected in the activity graph 114 at the same time a new unique ID 128 is generated. From operation 208, the routine 200 proceeds to operation 210, where it ends.

Figure 3:
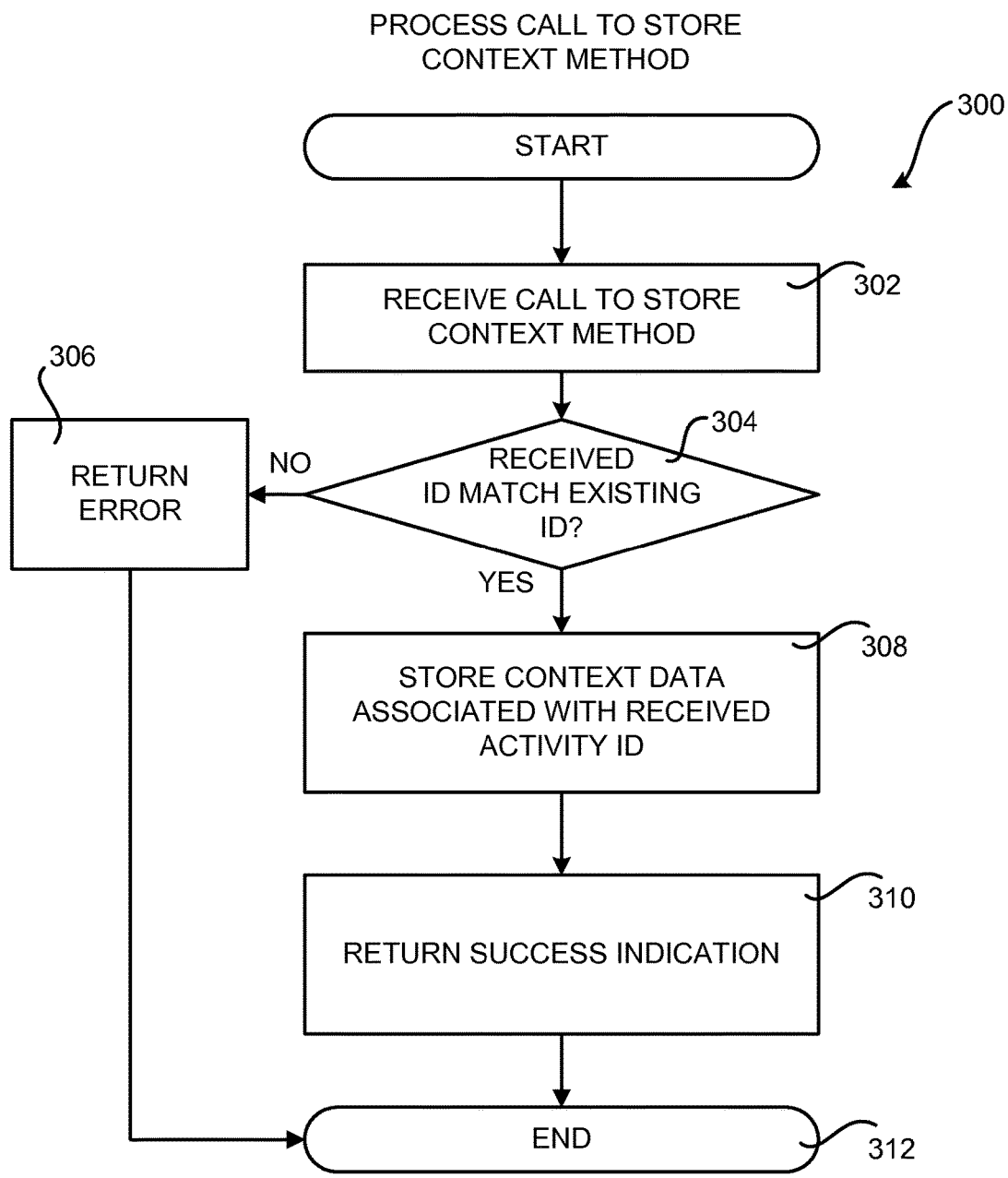
FIG. 3 is a flow diagram showing aspects of the operation of a store context method exposed by a context service in one implementation disclosed herein.

FIG. 3 is a flow diagram showing a routine 300 that illustrates aspects of the operation of the store context method 124B exposed by the context service 110 in one implementation disclosed herein. The routine 300 begins at operation 302, where the context service 110 (i.e. either the network-based context service 110A or the local context service 110B) receives a call to the store context method 124B for storing context data 132. In response to such a call, the routine 300 proceeds from operation 302 to operation 304, where the context service 110 determines if the activity ID 128 received with the call to the store context method 124B matches an existing activity ID in the activity graph 114. If the received activity ID 128 does not match an existing activity ID 128, then the routine 300 proceeds from operation 304 to operation 306, where an error can be returned in response to the call to the store context method 124B. The routine 300 then proceeds to operation 312, where it ends.

If, at operation 304, the context service 110 determines that the received activity ID 128 does match an existing activity ID 128, the routine 300 proceeds from operation 304 to operation 308. At operation 308, the context service 110 stores the received context data 132 in association with the received activity ID 128. The context data 132 might be stored in in the activity graph 114 or in another location in the data store 116. A success indication can then be returned in response to the call to the store context method 124B at operation 310. The routine 300 then proceeds from operation 310 to operation 312, where it ends.

Figure 4:
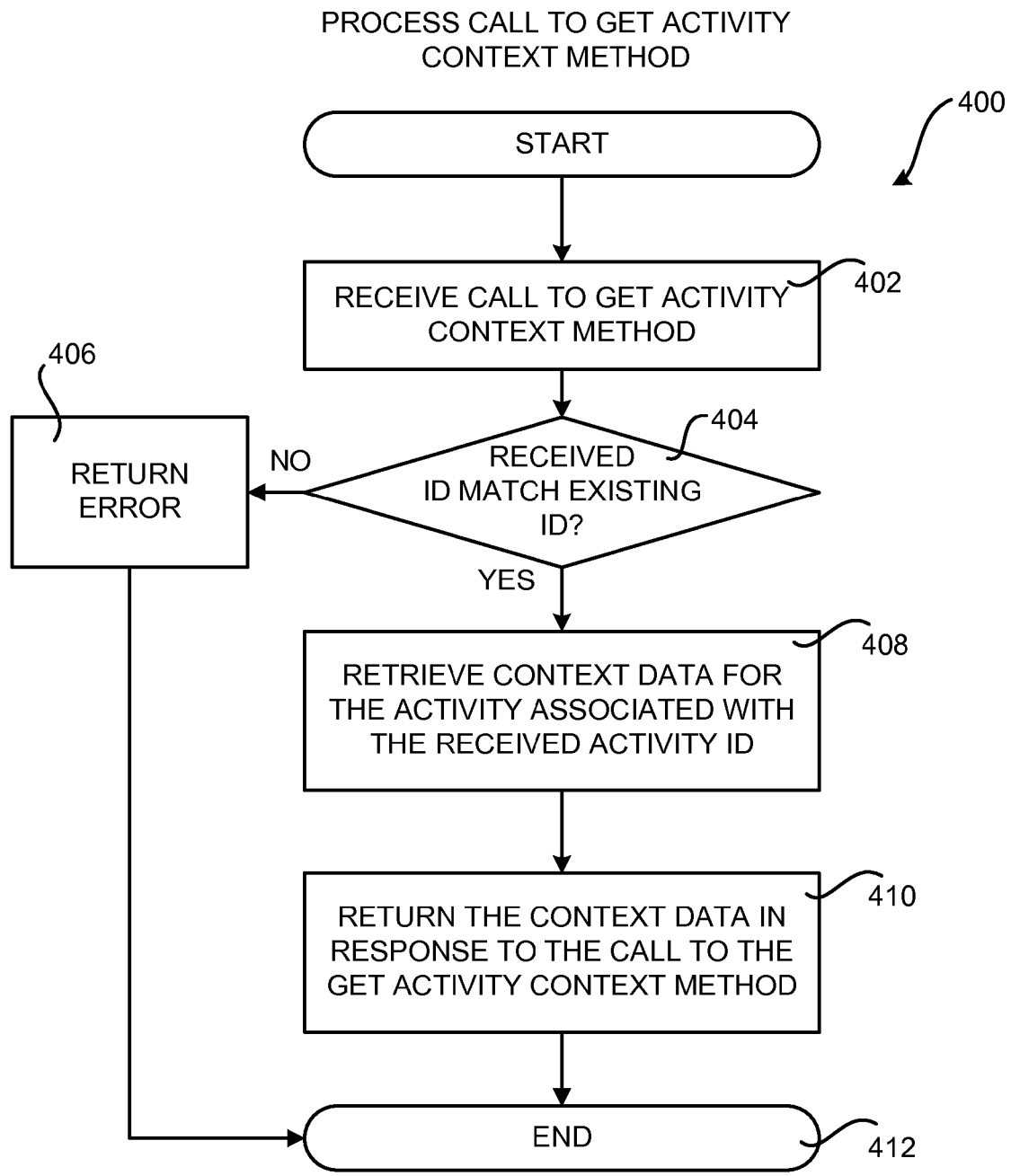
FIG. 4 is a flow diagram showing aspects of the operation of a get activity context method exposed by a context service in one implementation disclosed herein.

FIG. 4 is a flow diagram showing a routine 400 that illustrates aspects of the operation of the get activity context 124C method exposed by the context service 110 in one implementation disclosed herein. The routine 400 begins at operation 402, where the context service 110 (i.e. either the network-based context service 110A or the local context service 110B) receives a call to the get activity context method 124C for obtaining the context data 132 associated with an activity ID 128. In response to such a call, the routine 400 proceeds from operation 402 to operation 404, where the context service 110 determines if the activity ID 128 received with the call to the get activity context method 124C matches an existing activity ID in the activity graph 114. If the received activity ID 128 does not match an existing activity ID 128, then the routine 400 proceeds from operation 404 to operation 406, where an error can be returned in response to the call to the get activity context method 124C. The routine 400 then proceeds to operation 412, where it ends.

If, at operation 404, the context service 110 determines that the received activity ID 128 does match an existing activity ID 128, the routine 400 proceeds from operation 404 to operation 408. At operation 408, the context service 110 retrieves the context data 132 stored in the data store 116 that is associated with the received activity ID 128. The context data 132 is then returned in response to the call to the get activity context method 124C at operation 410. The routine 400 then proceeds from operation 410 to operation 412, where it ends.

Figure 5:
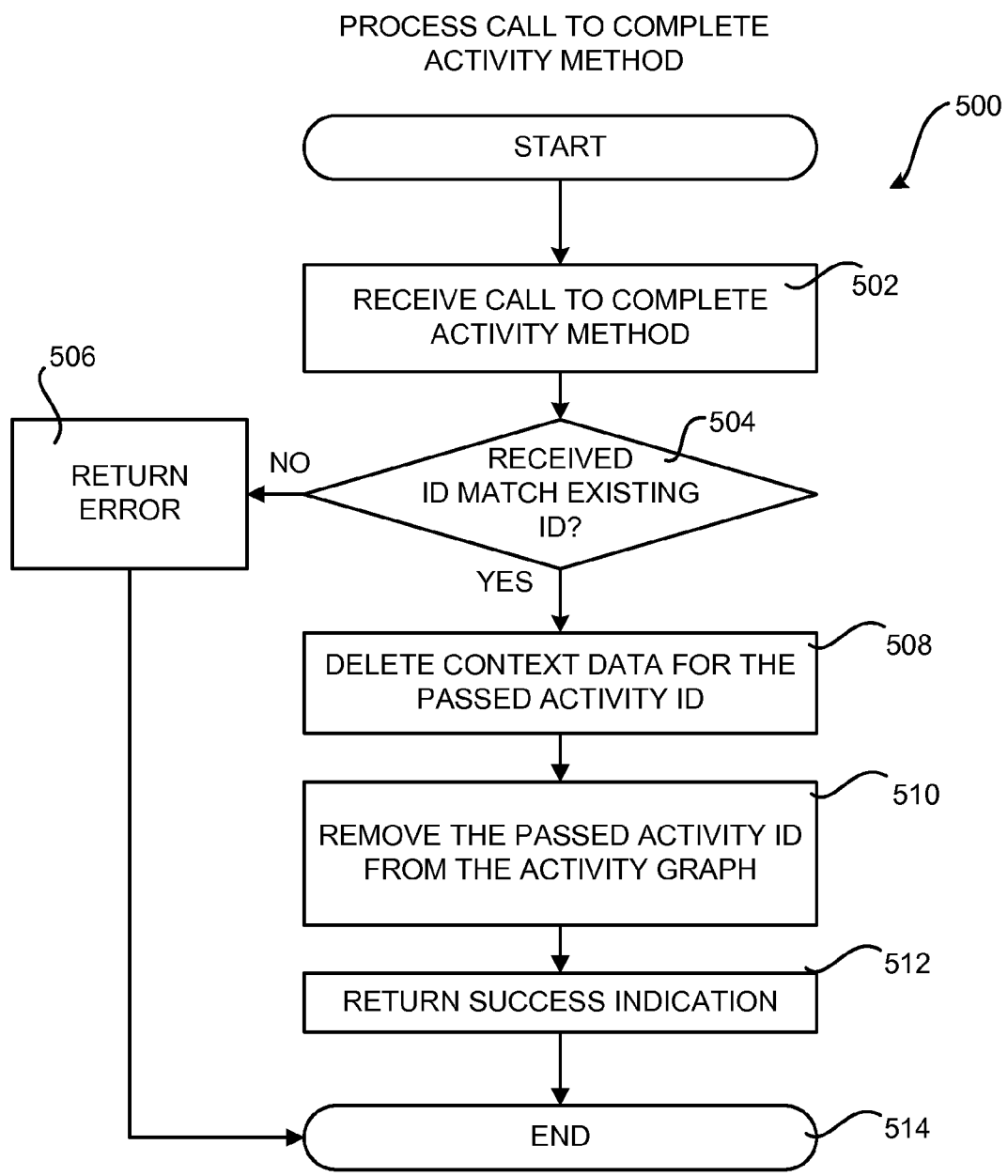
FIG. 5 is a flow diagram showing aspects of the operation of a complete activity method exposed by a context service in one implementation disclosed herein.

FIG. 5 is a flow diagram showing a routine 500 that illustrates aspects of the operation of the complete activity method 124D exposed by the context service 110 in one implementation disclosed herein. The routine 500 begins at operation 502, where the context service 110 (i.e. either the network-based context service 110A or the local context service 110B) receives a call to the complete activity method 124D for completing an activity. In response to such a call, the routine 500 proceeds from operation 502 to operation 504, where the context service 110 determines if the activity ID 128 received with the call to the complete activity method 124D matches an existing activity ID in the activity graph 114. If the received activity ID 128 does not match an existing activity ID 128, then the routine 500 proceeds from operation 504 to operation 506, where an error can be returned in response to the call to the complete activity method 124D The routine 500 then proceeds to operation 514, where it ends.

If, at operation 504, the context service 110 determines that the received activity ID 128 does match an existing activity ID 128, the routine 500 proceeds from operation 504 to operation 508. At operation 508, the context service 110 deletes the context data 132 associated with the passed activity ID 128 from the data store 106. The routine 500 then proceeds from operation 508 to operation 510, where the context service 110 removes the passed activity ID 128 from the activity graph 114, thereby destroying the parent/child relationship between the activity represented by the passed activity ID 128 and its parent, if any. From operation 510, the routine 500 proceeds to operation 512, where a success indication can be returned in response to the call to the complete activity method 124D indicating that the context data 132 associated with the passed activity ID 128 was successfully deleted. The routine 500 then proceeds from operation 512 to operation 514, where it ends.

In some configurations the parent/child relationship between different activities can be removed from the activity graph 114 in an automated fashion. For example, and without limitation, a child activity ID 128 might be removed from the activity graph 114 automatically if a specified period of time elapses following the creation of the activity ID. Activities might also be pruned from the activity graph 114 in an automated fashion in response to other conditions in other configurations.

Figure 6:
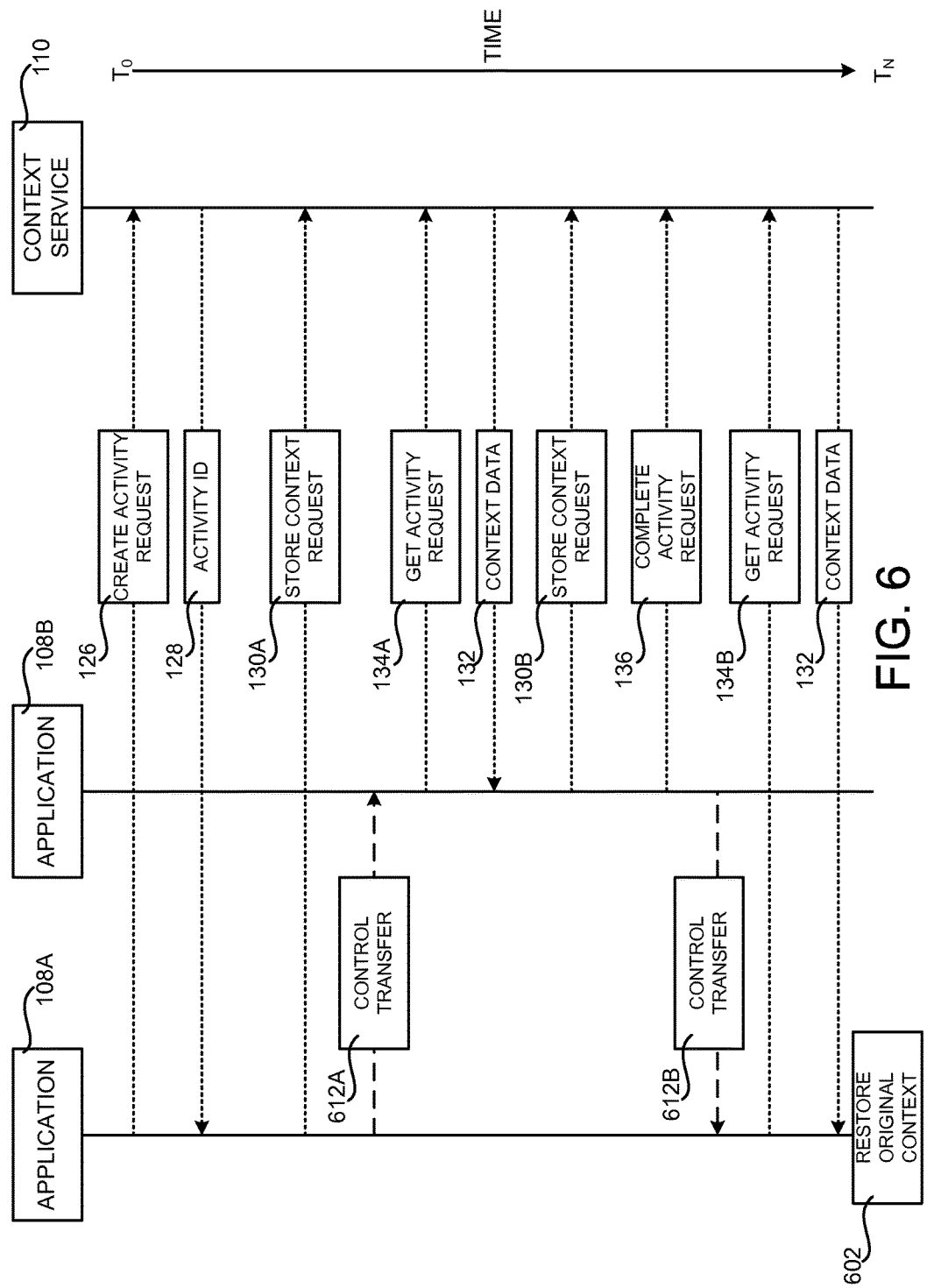
FIG. 6 is a timing diagram illustrating aspects of the utilization of a context service to provide a seamless transition between applications according to one particular implementation disclosed herein.

FIG. 6 is a timing diagram illustrating aspects of the utilization of the context service 110 to provide a seamless transition between two applications 108A and 108B, according to one particular implementation disclosed herein. In the example scenario illustrated in FIG. 6, two applications 108A and 108B are executed on the same computing device 102 or on different computing devices 102. As described below, the applications 108A and 108B can utilize the methods 124 exposed by the context service 110 to created and exchange context data 132. Additional details regarding this process are provided below.

As illustrated in FIG. 6, the application 108A can first transmit a create activity request 126 to the method 124A exposed by the context service 110 to create a new activity ID 128. In response thereto, the context service 110 creates the new activity ID 128 and returns the activity ID 128 in response to the call to the method 124A. The new activity ID 128 corresponds to the execution of the application 108A in this example.

Once the application 108A has the new activity ID 128, the application 108A can transmit a store context request 130A to the method 124B exposed by the context service 110. For example, the application 108A can utilize the method 124B to store context data 132 that includes a deep hyperlink that can be utilized to return the application 108A to the state it was in just prior to the transition of control to the application 108B. As discussed above, the context data 132 can also store other types of XML, JSON, or other types of data for use by the application 108B.

At operation 612A, control is transferred from the application 108A to the application 108B. For example, the application 108B might begin executing in the foreground and utilizing the entire display of a computing device 102. Following the control transfer, the application 108B can transmit a get activity request 134A to the method 124C exposed by context service 110 to obtain the context data 132 previously stored by the application 108A. The application 108B can then utilize the context data 132 in various ways, some of which were described above.

Once the application 108B has completed its operations, the application 108B may transmit a store context request 130B to the method 124B exposed by the context service 110 to update the previously stored context data 132 with a transcript of its operations. The application 108B might also generate a complete activity request 136 to the method 124D exposed by the context service 110 in order to complete the activity associated with the execution of the application 108B.

At operation 612B, control is transferred from application 108B back to operation 108A. Following the transfer of control back to the application 108A, the application 108A can call the method 124C exposed by the context service 110 to obtain the context data 132. As discussed above, the context data 132 can include a deep hyperlink or other information that the application 108A can utilize to restore the application 108A to its state prior to the transition to the application 108B. The context data 132 can also include a transcript of the operations performed by the application 108B.

Accordingly, at operation 602 the application 108A can utilize the context data 132 to restore its state (e.g. its user interface) to the condition it was in just prior to the transition of control to the application 108B. The application 108A might also display or otherwise utilize the transcript posted to the context data 132 by the application 108B. The application 108A might also utilize the context data 132 in other ways not specifically mentioned herein.

Figure 7:
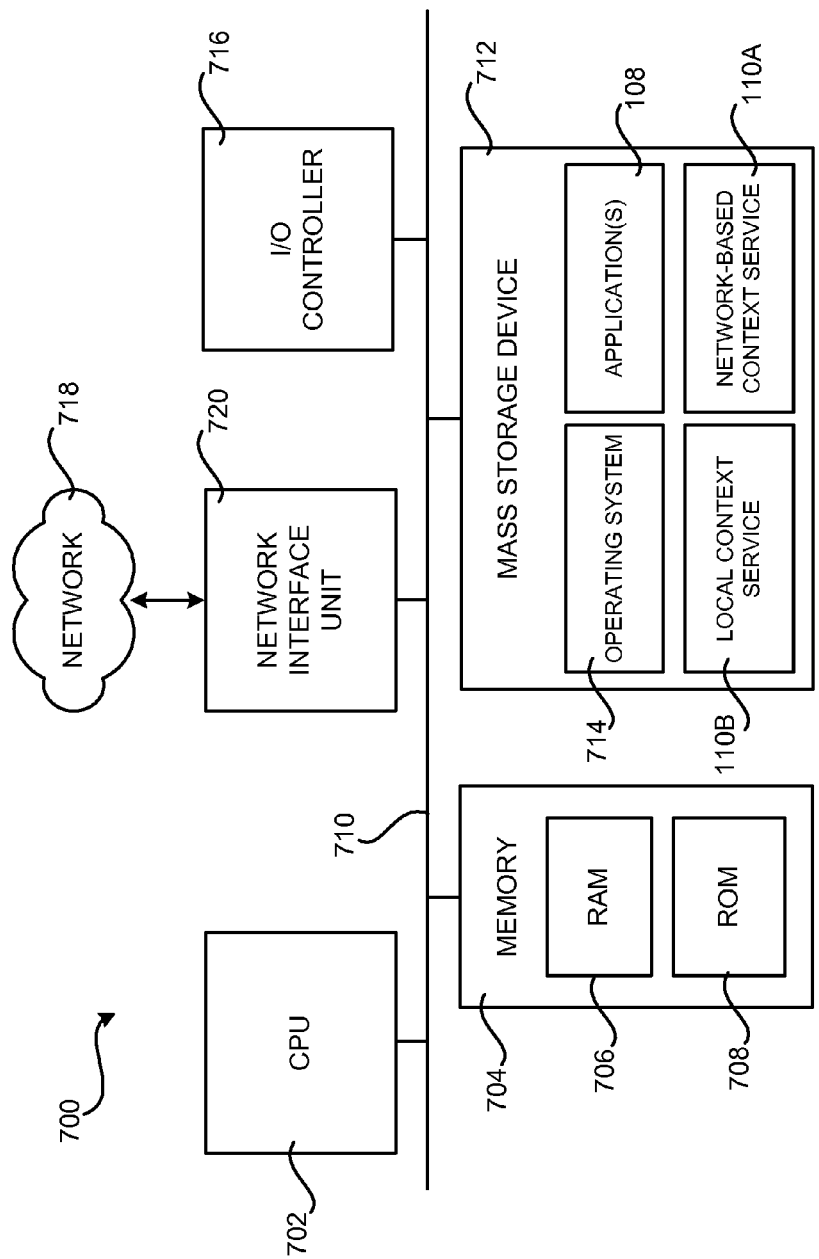
FIG. 7 is a computer architecture diagram illustrating an illustrative computer hardware and software architecture for a computing system capable of implementing aspects of the technologies presented herein.

FIG. 7 is a computer architecture diagram that shows an architecture for a computer 700 capable of executing the software components described herein for seamless transitions between applications and devices. The architecture illustrated in FIG. 7 is an architecture for a server computer, mobile phone, an e-reader, a smart phone, a desktop computer, a netbook computer, a tablet computer, a laptop computer, or another type of computing device suitable for executing the software components presented herein. In this regard, it should be appreciated that the computer 700 shown in FIG. 7 can be utilized to implement a computing device capable of executing any of the software components presented herein. For example, and without limitation, the computer 700 can be utilized to implement a computing device capable of executing the applications 108 along with the local context service 110B. The computer 700 can also be utilized to implement a computing device, such as a server computer, that executes in the distributed computing environment 104 to execute the network-based context service 110A.

The computer 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer 700, such as during startup, is stored in the ROM 708. The computer 700 further includes a mass storage device 712 for storing the operating system 714 and one or more programs including, but not limited to, the applications 108, the network-based context service 110A, or the local context service 110B. Although not shown in FIG. 7, the mass storage device 712 can also be configured to store other types of programs and data, such as the context data 132.

The mass storage device 712 is connected to the CPU 702 through a mass storage controller (not shown) connected to the bus 710. The mass storage device 712 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media can include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 718. The computer 700 can connect to the network 718 through a network interface unit 720 connected to the bus 710. It should be appreciated that the network interface unit 720 also can be utilized to connect to other types of networks and remote computer systems. The computer 700 also can include an input/output controller 716 for receiving and processing input from a number of other devices, including a keyboard, mouse, or electronic stylus (not shown in FIG. 7). Similarly, the input/output controller 716 can provide output to a display screen, a printer, or other type of output device (also not shown in FIG. 7).

It should be appreciated that the software components described herein can, when loaded into the CPU 702 and executed, transform the CPU 702 and the overall computer 700 from a general-purpose computing system into a special-purpose computing system customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein also can transform the physical structure of the computer-readable media presented herein. The specific transformation of physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the computer 700 can include other types of computing devices, including hand-held computers, embedded computer systems, mobile devices such as smartphones and tablets, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
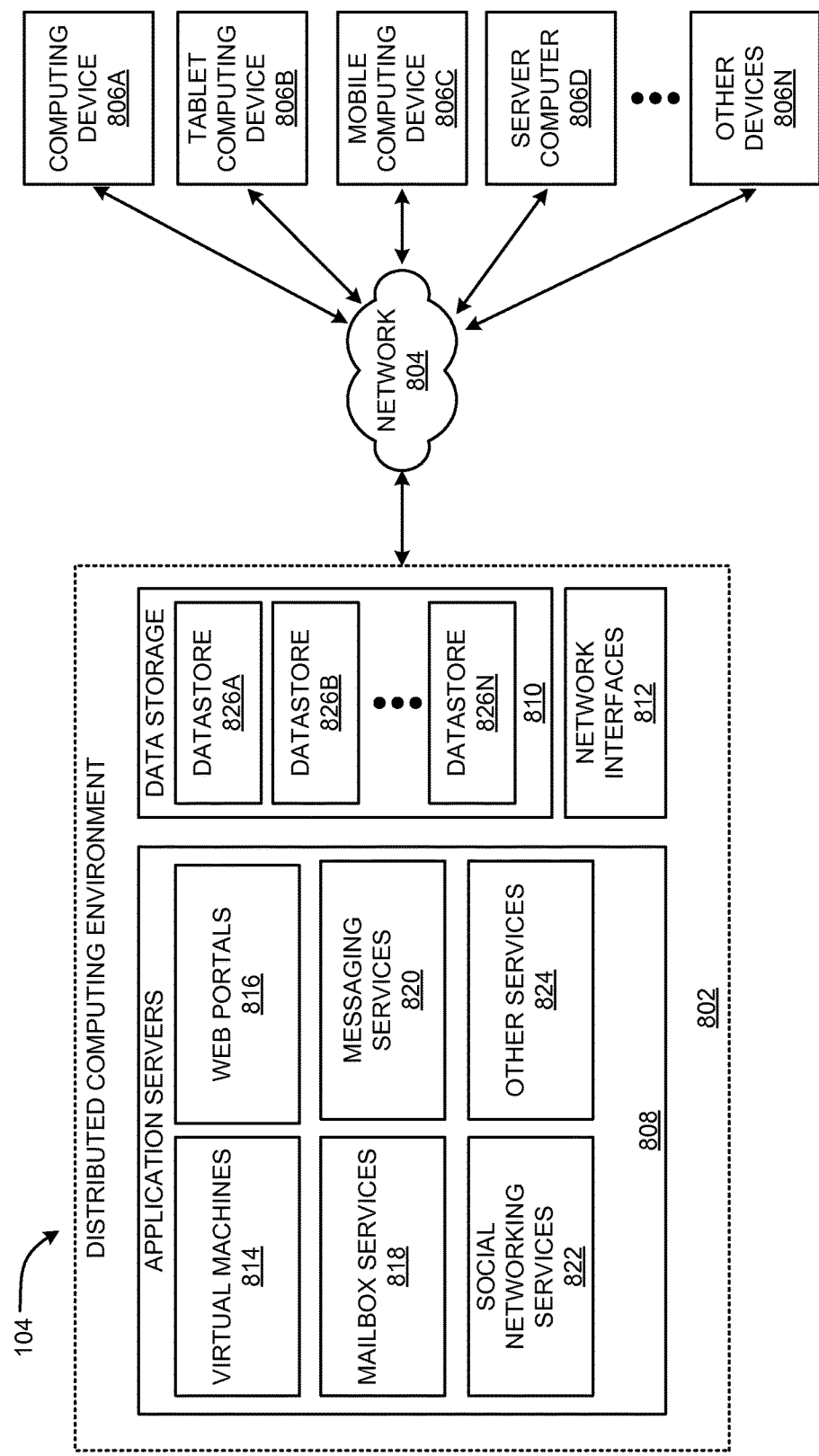
FIG. 8 is a diagram illustrating a distributed computing environment capable of implementing aspects of the technologies presented herein.

FIG. 8 illustrates an illustrative distributed computing environment 104 capable of executing the software components described herein for providing seamless transitions between applications and devices. Thus, the distributed computing environment 104 illustrated in FIG. 8 can be used to provide the functionality described herein with respect to the network-based context service 110A and/or any of the other software components described herein.

According to various implementations, the distributed computing environment 104 includes a computing environment 802 operating on, in communication with, or as part of a network 804. One or more client devices 806A-806N (hereinafter referred to collectively and/or generically as "clients 806") can communicate with the computing environment 802 via the network 804 and/or other connections (not illustrated in FIG. 8). In the illustrated configuration, the clients 806 include a computing device 806A such as a laptop computer, a desktop computer, or other computing device; a "slate" or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802. Two example computing architectures for the clients 806 are illustrated and described herein with reference to FIGS. 7 and 9. It should be understood that the illustrated clients 806 and computing architectures illustrated and described herein are illustrative, and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services such as those described herein, virtual machines, portals, and/or other resources. In the illustrated configuration, the application servers 808 host one or more virtual machines 814 for hosting applications or other functionality. According to various implementations, the virtual machines 814 host one or more applications and/or software modules, such as the network-based context service 110A. It should be understood that this configuration is illustrative, and should not be construed as being limiting in any way. The application servers 808 might also host or provide access to one or more Web portals, link pages, Web sites, and/or other information ("Web portals") 816.

According to various implementations, the application servers 808 also include one or more mailbox services 818 and one or more messaging services 820. The mailbox services 818 can include electronic mail ("email") services. The mailbox services 818 also can include various personal information management ("PIM") services including, but not limited to, calendar services, contact management services, collaboration services, and/or other services. The messaging services 820 can include, but are not limited to, instant messaging ("IM") services, chat services, forum services, and/or other communication services.

The application servers 808 also can include one or more social networking services 822. The social networking services 822 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 822 are provided by other services, sites, and/or providers that might be referred to as "social networking providers." For example, some web sites allow users to interact with one another via email, chat services, and/or other means during various activities and/or contexts such as reading published articles, commenting on goods or services, publishing, collaboration, gaming, and the like. Other services are possible and are contemplated.

The social networking services 822 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 822 are not mentioned herein for the sake of brevity. As such, the configurations described above are illustrative, and should not be construed as being limited in any way.

As also shown in FIG. 8, the application servers 808 also can host other services, applications, portals, and/or other resources ("other services") 824. The other services 824 can include, but are not limited to, the network-based context service 110A, and/or any of the other software components described herein. It thus can be appreciated that the computing environment 802 can provide integration of the concepts and technologies disclosed herein provided herein for seamless transitions between applications and devices with various mailbox, messaging, social networking, productivity and/or other services or resources.

As mentioned above, the computing environment 802 can include data storage 810. According to various implementations, the functionality of the data storage 810 is provided by one or more databases operating on, or in communication with, the network 804. The functionality of the data storage 810 also can be provided by one or more server computers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the application servers 808 and/or other data. For example, the datastores 826 can be utilized to store the context data 132, the activity graph 114, and/or other types of data.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 can also be utilized to connect to other types of networks and/or computer systems.

It should be understood that the distributed computing environment 800 described herein can implement any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the clients 806. It should be understood that the clients 806 can also include real or virtual machines including, but not limited to, server computers, web servers, personal computers, mobile computing devices, smart phones, and/or other devices. As such, various implementations of the concepts and technologies disclosed herein enable any device configured to access the distributed computing environment 800 to utilize the functionality described herein for seamless transitions between applications and devices.

Figure 9:
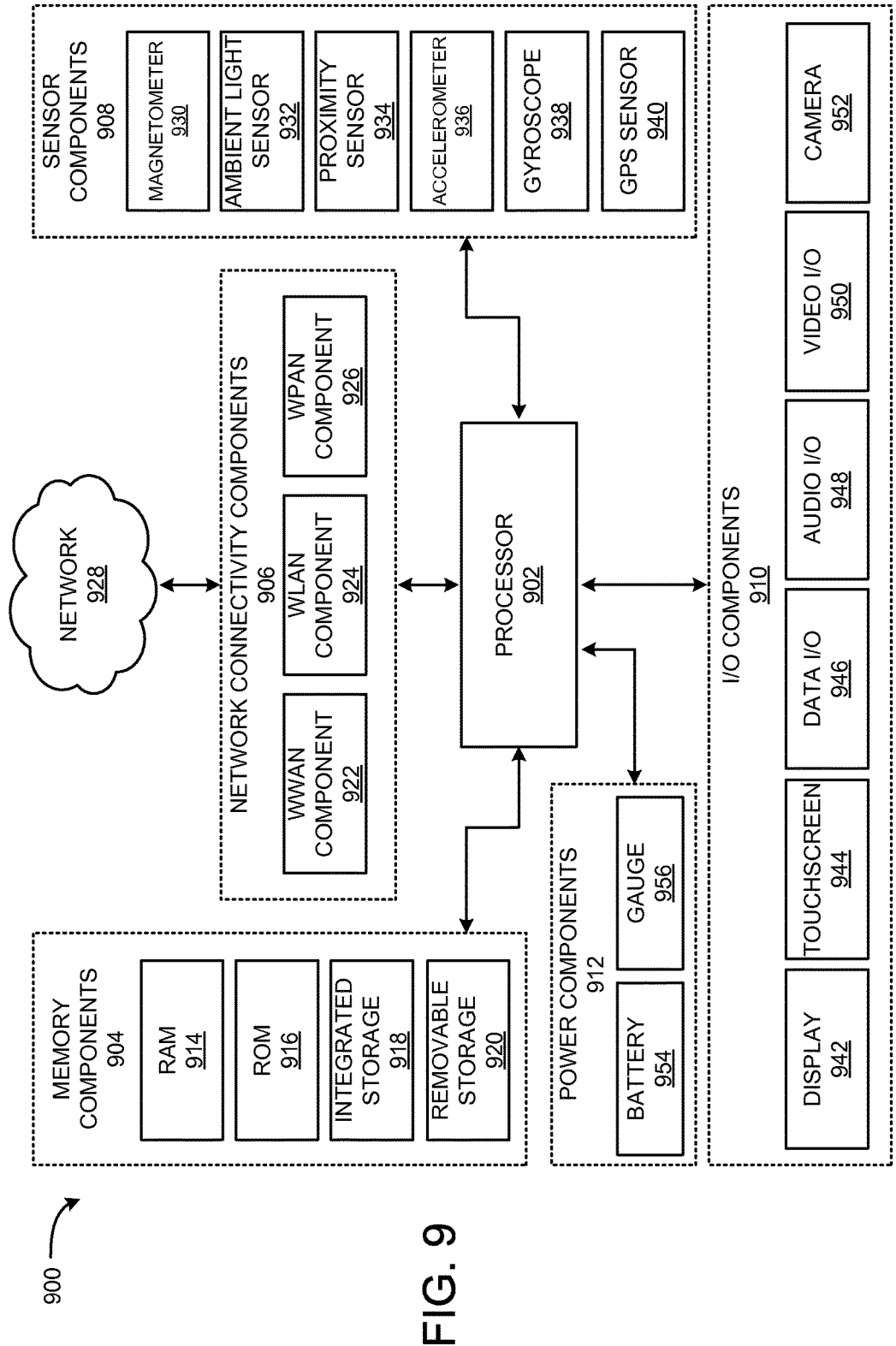
FIG. 9 is a computer architecture diagram illustrating a computing device architecture capable of implementing aspects of the technologies presented herein.

Turning now to FIG. 9, an illustrative computing device architecture 900 will be described for a computing device that is capable of executing various software components described herein for providing seamless transitions between applications and devices. The computing device architecture 900 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. Moreover, the computing device architecture 900 is applicable to any of the clients 806 shown in FIG. 8. Furthermore, aspects of the computing device architecture 900 are applicable to traditional desktop computers, portable computers (e.g., laptops, notebooks, ultra-portables, and netbooks), server computers, and other computer systems, such as described herein with reference to FIG. 7. For example, the single touch and multi-touch aspects disclosed herein below can be applied to desktop computers that utilize a touchscreen or some other touch-enabled device, such as a touch-enabled track pad or touch-enabled mouse.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes one or more central processing unit ("CPU") cores configured to process data, execute computer-executable instructions of one or more application programs, and communicate with other components of the computing device architecture 900 in order to perform various functionality described herein. The processor 902 can be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, 4K, and greater), video games, 3D modeling applications, and the like. In some configurations, the processor 902 is configured to communicate with a discrete GPU (not shown). In any case, the CPU and GPU can be configured in accordance with a co-processing CPU/GPU computing model, wherein the sequential part of an application executes on the CPU and the computationally-intensive part is accelerated by the GPU.

In some configurations, the processor 902 is, or is included in, a system-on-chip ("SoC") along with one or more of the other components described herein below. For example, the SoC can include the processor 902, a GPU, one or more of the network connectivity components 906, and one or more of the sensor components 908. In some configurations, the processor 902 is fabricated, in part, utilizing a package-on-package ("PoP") integrated circuit packaging technique. Moreover, the processor 902 can be a single core or multi-core processor.

The processor 902 can be created in accordance with an ARM architecture, available for license from ARM HOLDINGS of Cambridge, United Kingdom. Alternatively, the processor 902 can be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a RAM 914, a ROM 916, an integrated storage memory ("integrated storage") 918, and a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 or the removable storage 920.

The integrated storage 918 can include a solid-state memory, a hard disk, or a combination of solid-state memory and a hard disk. The integrated storage 918 can be soldered or otherwise connected to a logic board upon which the processor 902 and other components described herein might also be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available and shown to a user as a total combined capacity of the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to, the WINDOWS MOBILE OS, the WIN- DOWS PHONE OS, or the WINDOWS OS from MICROSOFT CORPORATION, BLACKBERRY OS from RESEARCH IN MOTION, LTD. of Waterloo, Ontario, Canada, IOS from APPLE INC. of Cupertino, Calif., and ANDROID OS from GOOGLE, INC. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from a network 928, which can be a WWAN, a WLAN, or a WPAN. Although a single network 928 is illustrated, the network connectivity components 906 can facilitate simultaneous communication with multiple networks. For example, the network connectivity components 906 can facilitate simultaneous communications with multiple networks via one or more of a WWAN, a WLAN, or a WPAN.

The network 928 can be a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 928 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 928 can be configured to provide voice and/or data communications with any combination of the above technologies. The network 928 can be configured to or adapted to provide voice and/or data communications in accordance with future generation technologies.

In some configurations, the WWAN component 922 is configured to provide dual-multi-mode connectivity to the network 928. For example, the WWAN component 922 can be configured to provide connectivity to the network 928, wherein the network 928 provides service via GSM and UMTS technologies, or via some other combination of technologies. Alternatively, multiple WWAN components 922 can be utilized to perform such functionality, and/or provide additional functionality to support other non-compatible technologies (i.e., incapable of being supported by a single WWAN component). The WWAN component 922 can facilitate similar connectivity to multiple networks (e.g., a UMTS network and an LTE network).

The network 928 can be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 928 via the WI-FI access points. Such connections can be secured via various encryption technologies including, but not limited, WI-FI Protected Access ("WPA"), WPA2, Wired Equivalent Privacy ("WEP"), and the like.

The network 928 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 930, an ambient light sensor 932, a proximity sensor 934, an accelerometer 936, a gyroscope 938, and a Global Positioning System sensor ("GPS sensor") 940. It is contemplated that other sensors, such as, but not limited to, temperature sensors or shock detection sensors, might also be incorporated in the computing device architecture 900.

The magnetometer 930 is configured to measure the strength and direction of a magnetic field. In some configurations the magnetometer 930 provides measurements to a compass application program stored within one of the memory components 904 in order to provide a user with accurate directions in a frame of reference including the cardinal directions, north, south, east, and west. Similar measurements can be provided to a navigation application program that includes a compass component. Other uses of measurements obtained by the magnetometer 930 are contemplated.

The ambient light sensor 932 is configured to measure ambient light. In some configurations, the ambient light sensor 932 provides measurements to an application program stored within one the memory components 904 in order to automatically adjust the brightness of a display (described below) to compensate for low-light and high-light environments. Other uses of measurements obtained by the ambient light sensor 932 are contemplated.

The proximity sensor 934 is configured to detect the presence of an object or thing in proximity to the computing device without direct contact. In some configurations, the proximity sensor 934 detects the presence of a user's body (e.g., the user's face) and provides this information to an application program stored within one of the memory components 904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 934 are contemplated.

The accelerometer 936 is configured to measure proper acceleration. In some configurations, output from the accelerometer 936 is used by an application program as an input mechanism to control some functionality of the application program. In some configurations, output from the accelerometer 936 is provided to an application program for use in switching between landscape and portrait modes, calculating coordinate acceleration, or detecting a fall. Other uses of the accelerometer 936 are contemplated.

The gyroscope 938 is configured to measure and maintain orientation. In some configurations, output from the gyroscope 938 is used by an application program as an input mechanism to control some functionality of the application program. For example, the gyroscope 938 can be used for accurate recognition of movement within a 3D environment of a video game application or some other application. In some configurations, an application program utilizes output from the gyroscope 938 and the accelerometer 936 to enhance control of some functionality of the application program. Other uses of the gyroscope 938 are contemplated.

The GPS sensor 940 is configured to receive signals from GPS satellites for use in calculating a location. The location calculated by the GPS sensor 940 can be used by any application program that requires or benefits from location information. For example, the location calculated by the GPS sensor 940 can be used with a navigation application program to provide directions from the location to a destination or directions from the destination to the location. Moreover, the GPS sensor 940 can be used to provide location information to an external location-based service, such as E911 service. The GPS sensor 940 can obtain location information generated via WI-FI, WIMAX, and/or cellular triangulation techniques utilizing one or more of the network connectivity components 906 to aid the GPS sensor 940 in obtaining a location fix. The GPS sensor 940 can also be used in Assisted GPS ("A-GPS") systems.

The I/O components 910 include a display 942, a touchscreen 944, a data I/O interface component ("data I/O") 946, an audio I/O interface component ("audio I/O") 948, a video I/O interface component ("video I/O") 950, and a camera 952. In some configurations, the display 942 and the touchscreen 944 are combined. In some configurations two or more of the data I/O component 946, the audio I/O component 948, and the video I/O component 950 are combined. The I/O components 910 can include discrete processors configured to support the various interface described below, or might include processing functionality built-in to the processor 902.

The display 942 is an output device configured to present information in a visual form. In particular, the display 942 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 942 is a liquid crystal display ("LCD") utilizing any active or passive matrix technology and any backlighting technology (if used). In some configurations, the display 942 is an organic light emitting diode ("OLED") display. Other display types are contemplated.

The touchscreen 944 is an input device configured to detect the presence and location of a touch. The touchscreen 944 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 944 is incorporated on top of the display 942 as a transparent layer to enable a user to use one or more touches to interact with objects or other information presented on the display 942. In other configurations, the touchscreen 944 is a touch pad incorporated on a surface of the computing device that does not include the display 942. For example, the computing device can have a touchscreen incorporated on top of the display 942 and a touch pad on a surface opposite the display 942.

In some configurations, the touchscreen 944 is a single-touch touchscreen. In other configurations, the touchscreen 944 is a multi-touch touchscreen. In some configurations, the touchscreen 944 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 944. As such, a developer can create gestures that are specific to a particular application program.

In some configurations, the touchscreen 944 supports a tap gesture in which a user taps the touchscreen 944 once on an item presented on the display 942. The tap gesture can be used for various reasons including, but not limited to, opening or launching whatever the user taps. In some configurations, the touchscreen 944 supports a double tap gesture in which a user taps the touchscreen 944 twice on an item presented on the display 942. The double tap gesture can be used for various reasons including, but not limited to, zooming in or zooming out in stages. In some configurations, the touchscreen 944 supports a tap and hold gesture in which a user taps the touchscreen 944 and maintains contact for at least a pre-defined time. The tap and hold gesture can be used for various reasons including, but not limited to, opening a context-specific menu.

In some configurations, the touchscreen 944 supports a pan gesture in which a user places a finger on the touchscreen 944 and maintains contact with the touchscreen 944 while moving the finger on the touchscreen 944. The pan gesture can be used for various reasons including, but not limited to, moving through screens, images, or menus at a controlled rate. Multiple finger pan gestures are also contemplated. In some configurations, the touchscreen 944 supports a flick gesture in which a user swipes a finger in the direction the user wants the screen to move. The flick gesture can be used for various reasons including, but not limited to, scrolling horizontally or vertically through menus or pages. In some configurations, the touchscreen 944 supports a pinch and stretch gesture in which a user makes a pinching motion with two fingers (e.g., thumb and forefinger) on the touchscreen 944 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 944. As such, the above gestures should be understood as being illustrative and should not be construed as being limiting in any way.

The data I/O interface component 946 is configured to facilitate input of data to the computing device and output of data from the computing device. In some configurations, the data I/O interface component 946 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 948 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio interface component 948 includes a speaker for the output of audio signals. In some configurations, the audio I/O interface component 946 includes an optical audio cable out.

The video I/O interface component 950 is configured to provide video input and/or output capabilities to the computing device. In some configurations, the video I/O interface component 950 includes a video connector configured to receive video as input from another device (e.g., a video media player such as a DVD or BLURAY player) or send video as output to another device (e.g., a monitor, a television, or some other external display). In some configurations, the video I/O interface component 950 includes a High-Definition Multimedia Interface ("HDMI"), mini-HDMI, micro-HDMI, DisplayPort, or proprietary connector to input/output video content. In some configurations, the video I/O interface component 950 or portions thereof is combined with the audio I/O interface component 948 or portions thereof.

The camera 952 can be configured to capture still images and/or video. The camera 952 can utilize a charge coupled device ("CCD") or a complementary metal oxide semiconductor ("CMOS") image sensor to capture images. In some configurations, the camera 952 includes a flash to aid in taking pictures in low-light environments. Settings for the camera 952 can be implemented as hardware or software buttons.

Although not illustrated, one or more hardware buttons can also be included in the computing device architecture 900. The hardware buttons can be used for controlling some operational aspect of the computing device. The hardware buttons can be dedicated buttons or multi-use buttons. The hardware buttons can be mechanical or sensor-based.

The illustrated power components 912 include one or more batteries 954, which can be connected to a battery gauge 956. The batteries 954 can be rechargeable or disposable. Rechargeable battery types include, but are not limited to, lithium polymer, lithium ion, nickel cadmium, and nickel metal hydride. Each of the batteries 954 can be made of one or more cells.

The battery gauge 956 can be configured to measure battery parameters such as current, voltage, and temperature. In some configurations, the battery gauge 956 is configured to measure the effect of a battery's discharge rate, temperature, age and other factors to predict remaining life within a certain percentage of error. In some configurations, the battery gauge 956 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 912 can also include a power connector, which can be combined with one or more of the aforementioned I/O components 910. The power components 912 can interface with an external power system or charging equipment via a power I/O component 944.

The various technologies disclosed herein can be considered in view of the following clauses:

Clause 1. An apparatus, comprising: one or more processors; and at least one computer storage medium having computer executable instructions stored thereon which, when executed by the one or more processors, cause the apparatus to expose an interface for storing and retrieving context data associated with an activity, the interface comprising a first method for storing the context data (associated with the activity and a second method for retrieving the context data, receive a call to the first method comprising the context data and an activity identifier (ID) associated with the activity, store the context data in association with the activity ID in response to the call to the first method, receive a call to the second method comprising the activity ID, and return the context data associated with the activity ID in response to the call to the second method.

Clause 2. The apparatus of clause 1, wherein the interface comprises a network services application programming interface (API).

Clause 3. The apparatus of clauses 1 and 2, wherein the interface comprises a local application programming interface (API).

Clause 4. The apparatus of clauses 1-3, wherein the call to the first method is made by a first application executing on a first computing device and wherein the call to the second method is made by a second application executing on the first computing device.

Clause 5. The apparatus of clauses 1-4, wherein the call to the first method is made by a first application executing on a first computing device and wherein the call to the second method is made by a second application executing on a second computing device.

Clause 6. The apparatus of clauses 1-5, wherein the context data comprises data defining a state of an application making the call to the first method.

Clause 7. The apparatus of clauses 1-6, wherein the application is further configured to call the second method to obtain the data defining the state of the application and to utilize the data to return the application to the state.

Clause 8. A computer-implemented method, comprising: executing a context service configured to expose an interface for storing and retrieving context data associated with an activity, the interface comprising a first method for storing the context data associated with the activity and a second method for retrieving the context data; receiving a call to the first method, the call to the first method comprising the context data associated with the activity and an activity identifier (ID) associated with the activity; in response to the call to the first method, storing the context data in association with the activity ID and data describing an association between the context data and one or more parent activities; receiving a call to the second method, the call to the second method comprising the activity ID; and in response to the call to the second method, retrieving the context data associated with the activity ID and returning the context data in response to the call to the second method.

Clause 9. The computer-implemented method of clause 8, wherein the interface comprises a network services application programming interface (API).

Clause 10. The computer-implemented method of clauses 8 and 9, wherein the interface comprises a local application programming interface (API).

Clause 11. The computer-implemented method of clauses 8-10, wherein the interface further comprises a third method for creating the activity ID associated with the activity.

Clause 12. The computer-implemented method of clauses 8-11, wherein the interface further comprises a fourth method for completing the activity, and wherein the method further comprises receiving a call the fourth method and, in response to the call to the fourth method, deleting the stored context data and the activity ID.

Clause 13. The computer-implemented method of clauses 8-12, wherein the context data comprises data defining a state of an application making the call to the first method, and wherein the application is further configured to call the second method to obtain the data and to utilize the data to return the application to the state.

Clause 14. The computer-implemented method of clauses 8-13, wherein the call to the first method is made by a first application executing on a first computing device and wherein the call to the second method is made by a second application executing on the first computing device.

Clause 15. The computer-implemented method of clauses 8-14, wherein the call to the first method is made by a first application executing on a first computing device and wherein the call to the second method is made by a second application executing on a second computing device.

Clause 16. The computer-implemented method of clauses 8-15, further comprising exposing the context data to one or more business intelligence services.

Clause 17. A computer storage medium having computer executable instructions stored thereon which, when executed by a computer, cause the computer to: expose an interface for storing and retrieving context data associated with an activity, the interface comprising a first method for storing the context data associated with the activity and a second method for retrieving the context data; receive a call to the first method comprising the context data and an activity identifier (ID) associated with the activity; store the context data in association with the activity ID in response to the call to the first method; receive a call to the second method comprising the activity ID; and return the context data associated with the activity ID in response to the call to the second method.

Clause 18. The computer-storage medium of clause 17, wherein the interface comprises a network services application programming interface (API) or a local application programming interface (API).

Clause 19. The computer-storage medium of clauses 17 and 18, wherein the call to the first method is made by a first application executing on a first computing device and wherein the call to the second method is made by a second application executing on the first computing device.

Clause 20. The computer-storage medium of clauses 17-19, wherein the call to the first method is made by a first application executing on a first computing device and wherein the call to the second method is made by a second application executing on a second computing device.

Based on the foregoing, it should be appreciated that technologies for seamless transitions between applications and devices have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   one or more processors; and
   at least one memory device having computer executable instructions stored thereon which, when executed by the one or more processors, cause the apparatus to:
      maintain an activity graph defining a relationship between one or more activities and one or more unique activity identifiers;
      receive a first call from a first application;
      store, in response to receiving the first call, context data associated with an instance of an activity in association with a unique activity identifier associated with the instance of the activity;
      receive a second call from a second application, the second call including the unique activity identifier;
      in response to receiving the second call, create a transfer record within the activity graph, the transfer record indicating transfer of control from the first application to the second application;
      determine a match between the unique activity identifier and the one or more unique activity identifiers;
      retrieve the context data associated with the unique activity identifier in response to determining the match; and
      return the context data associated with the unique activity identifier in response to receiving the second call to retrieve the context data.

2. The apparatus of claim 1, wherein the context data comprises data defining a state of the first application.

3. The apparatus of claim 2, wherein the first application is further configured to retrieve the context data defining the state of the first application and to utilize the context data to restore the first application to the state.

4. The apparatus of claim 1, further comprising computer executable instructions which cause a processor to:
   determine a received activity identifier matches with a set of existing activity identifiers; and
   store the context data in association with the received activity identifier.

5. The apparatus of claim 1, further comprising computer executable instructions which cause a processor to:
   determine a received activity identifier matches with a set of existing activity identifiers;
   retrieve context data for the activity associated with the received activity identifier; and
   return the context data.

6. The apparatus of claim 1, wherein the unique activity identifier is a globally unique identifier.

7. The apparatus of claim 1, wherein the unique activity identifier is any type of data that uniquely identifies an activity.

8. A computer-implemented method, comprising:
   maintaining an activity graph defining a relationship between one or more activities and one or more unique activity identifiers;

receiving a first call, from a first application;

in response to receiving the first call, storing context data associated with an instance of an activity in association with a unique activity identifier associated with the instance of the activity;

receiving a second call, from a second application, to retrieve the context data, the second call including the unique activity identifier;

in response to receiving the second call, creating a transfer record within the activity graph, the transfer record indicating transfer of control from the first application to the second application;

determining a match between the unique activity identifier and the one or more unique activity identifiers;

retrieving the context data associated with the unique activity identifier in response to determining the match; and returning the context data in response to receiving the second call to retrieve the context data.

9. The computer-implemented method of claim 8, further comprising creating the unique activity identifier associated with the instance of the activity.

10. The computer-implemented method of claim 8, further comprising receiving a third call to complete the instance of the activity and, in response to the third call to complete the instance of the activity, deleting the stored context data and the unique activity identifier.

11. The computer-implemented method of claim 8, wherein the context data comprises data defining a state of the first application, and wherein the first application is further configured to retrieve the data and to utilize the data to restore the first application to the state.

12. The computer-implemented method of claim 8, wherein the first call is executed on a first computing device and wherein the second call is executed on the first computing device.

13. The computer-implemented method of claim 8, wherein the first call from the first application is executed on a first computing device and wherein the second call from the second application is executed on a second computing device.

14. The computer-implemented method of claim 8, further comprising exposing the context data to one or more business intelligence services.

15. The computer-implemented method of claim 8, further comprising:

determining a received activity identifier matches with a set of existing activity identifiers; and storing the context data in association with the received activity identifier.

16. The computer-implemented method of claim 8, further comprising:

determining a received activity identifier matches with a set of existing activity identifiers;

retrieving context data for the activity associated with the received activity identifier; and returning the context data.

17. A memory device having computer executable instructions stored thereon which, when executed by a processor, cause the processor to:

maintain an activity graph defining a relationship between one or more activities and one or more unique activity identifiers;

receive a first call, from a first application;

store context data associated with an instance of an activity in association with a unique activity identifier associated with the instance of the activity in response to the first call;

receive a second call, from a second application, to retrieve the context data, the second call including the unique activity identifier;

in response to receiving the second call, create a transfer record within the activity graph, the transfer record indicating transfer of control from the first application to the second application;

determine a match between the unique activity identifier and the one or more unique activity identifiers;

retrieve the context data associated with the unique activity identifier in response to determining the match; and return the context data associated with the unique activity identifier in response to the second call to retrieve the context data.

18. The memory device of claim 17, wherein the first call is executed on a first computing device and wherein the second call is executed on the first computing device.

19. The memory device of claim 17, wherein the first call is executed on a first computing device and wherein the second call is executed on a second computing device.

20. The memory device of claim 17, further comprising computer executable instructions which cause a processor to:

determine a received activity identifier matches with a set of existing activity identifiers; and store the context data in association with the received activity identifier.

* * * * *